United States Patent [19]

Culbertson et al.

[11] Patent Number: 4,775,291

[45] Date of Patent: Oct. 4, 1988

[54] MAGNETIC CLUTCH DRIVE AND THRUST BALANCING MECHANISM FOR ROTARY PUMPS

[75] Inventors: Samuel W. Culbertson, Arvada; Robert R. Mellette, Jamestown, both of Colo.

[73] Assignee: Binks Manufacturing Company, Franklin Park, Ill.

[21] Appl. No.: 78,408

[22] Filed: Jul. 27, 1987

[51] Int. Cl.$^4$ ................................................ F01D 3/00
[52] U.S. Cl. ................................ 415/104; 415/121 A; 415/168; 417/420
[58] Field of Search ........... 415/104, 107, 106, 121 A, 415/168, 169 R; 417/420

[56] References Cited

U.S. PATENT DOCUMENTS

| | | | |
|---|---|---|---|
| 3,280,750 | 10/1966 | White | 415/169 |
| 4,080,112 | 3/1978 | Zimmermann | 417/420 |
| 4,227,865 | 10/1980 | Erickson et al. | 415/104 |
| 4,538,960 | 9/1985 | Iino et al. | 415/104 |
| 4,613,289 | 9/1986 | Kotera | 417/420 |
| 4,648,808 | 3/1987 | Hauenstein | 417/420 |

Primary Examiner—Robert E. Garrett
Assistant Examiner—John T. Kwon
Attorney, Agent, or Firm—Juettner Pyle Lloyd & Verbeck

[57] ABSTRACT

A magnetic clutch drive for rotary pumps is characterized by a motor driven outer magnetic clutch member juxtaposed to an imperforate wall of a pump housing. Within the interior of the housing a pump impeller shaft carries an inner magnetic clutch member juxtaposed to the wall opposite from the outer member. The wall is of a nonmagnetic and electrically nonconductive material, so magnetic lines of force penetrate the wall and magnetically lock the outer and inner clutch members, without any mechanical connection between the two. Consequently, as the motor is brought up to speed, the two clutch members magnetically lock the motor shaft to the impeller shaft to drive the impeller shaft at the same speed as the motor shaft, without generating eddy current losses in the wall. Also included is a thrust balancing mechanism that uses the pressure of pumped liquid to develop and exert on the impeller shaft a force substantially equal in magnitude and opposite in direction to thrust forces exerted on the shaft during pump operation, and the interior of the housing wall is pressurized to maintain a dry operating environment for the inner clutch member.

14 Claims, 2 Drawing Sheets

MAGNETIC CLUTCH DRIVE AND THRUST BALANCING MECHANISM FOR ROTARY PUMPS

BACKGROUND OF THE INVENTION

The present invention relates to pumps, and in particular to a rotary pump having a magnetic clutch for coupling an impeller shaft to a motor for driving the shaft.

Industrial spray coating systems, for applying coatings of paint or other material to ware, often use a central supply system for providing the material to a plurality of coating stations. A supply of the material is contained in a tank, and is pumped through supply lines to various stations where coating equipment, such as spray guns, is connected with material in the lines. Where the material is of a type that settles upon standing, such as paint, the system preferably is of a circulating type that maintains the paint in motion. With such systems, paint is pumped from the tank through a line extending past all of the spraying stations, and then returned to the tank. A mixer in the tank agitates the paint, and couplings in the line at the stations allow spray paint equipment to connect to the line.

Conventionally, pumps for such systems are of the motor driven turbine type, consisting of one or more pumping stages. A disadvantage of such prior pumps is that the motor output is mechanically connected to the pump impeller shaft, requiring the shaft to extend through the pump housing in a rotary seal that is prone to leakage and frequent replacement. Also, should the pump become jammed as a consequence of induction of foreign matter, because of the mechanical connection one or both of the motor and pump may be damaged.

OBJECT OF THE INVENTION

An object of the invention is to provide an improved magnetic clutch drive for a rotary pump, that couples an impeller shaft of the pump to an output from a motor without need for a mechanical connection between the two.

Another object is to provide such a magnetic clutch drive, in which an inner magnetic clutch element is maintained in a dry, liquid free environment within the pump housing, and wherein eddy current losses in the housing are eliminated.

A further object is to provide such a magnetic clutch drive, in combination with a balancing mechanism that automatically and precisely counteracts thrust loading forces on the impeller shaft during pump operation.

SUMMARY OF THE INVENTION

In accordance with the present invention, an improved rotary pump comprises a pumping stage having an inlet and an outlet and an impeller shaft connected to an impeller in the stage, along with means for rotating the shaft and thereby the impeller to pump liquid from the inlet to the outlet. The shaft and impeller are axially movable and the liquid, upon rotation of the impeller, develops an axial thrust force on the impeller and therefore on the shaft. To counteract the thrust force, a thrust balance piston is connected to the shaft for axial movement conjointly with the shaft, and means are provided for coupling liquid at the pumping stage outlet with one end of the piston, such that the pressure of the liquid urges the piston and therefore the shaft in an axial direction opposite to that of the thrust force. In order that the thrust force might be evenly counteracted, also included are means for coupling liquid at the pumping stage outlet with an opposite end of the piston to exert pressure thereon to urge the piston and shaft in the same axial direction as that of the thrust force, along with means for controlling the pressure of liquid on the opposite end of the piston in accordance with the axial position of the piston and shaft, such that the pressure of liquid on the opposite end of the piston increases with axial movement of the piston and shaft in the direction against that of the thrust force and decreases with axial movement of the piston and shaft in the opposite direction. Consequently, upon operation of the pump the piston and shaft move axially to an equilibrium position whereat the force of liquid on the opposite end of the piston, together with the thrust force, substantially equal the force of liquid on the one end of the piston.

In a preferred embodiment, the impeller shaft extends to the exterior of the pumping stage and the means for rotating comprises a first magnetic clutch member connected to the shaft to the exterior of the stage for rotating the shaft, a second magnetic clutch member juxtaposed to but spaced from and magnetically coupled to the first magnetic clutch member, and means for rotating the second magnetic clutch member to conjointly rotate the first magnetic clutch member through the magnetic coupling to thereby rotate the shaft. To prevent pumped liquid from contacting the first magnetic clutch member, an impermeable shell of nonmagnetic and electrically nonconductive material extends around the first magnetic clutch member, between and out of contact with the first and second magnetic clutch members, and is fastened to and sealed with the pumping stage to enclose the first magnetic clutch member, and means are provided for maintaining a positive pressure of gas in the shell. To accommodate removal of any liquid that enters the shell, a flow path connects the shell interior with the pumping stage inlet for return of liquid to the inlet.

The foregoing and other objects, advantages and features of the invention will become apparent upon a consideration of the following detailed description, when taken in conjunction with the accompanying drawings.

DETAILED DESCRIPTION

Figure 1:
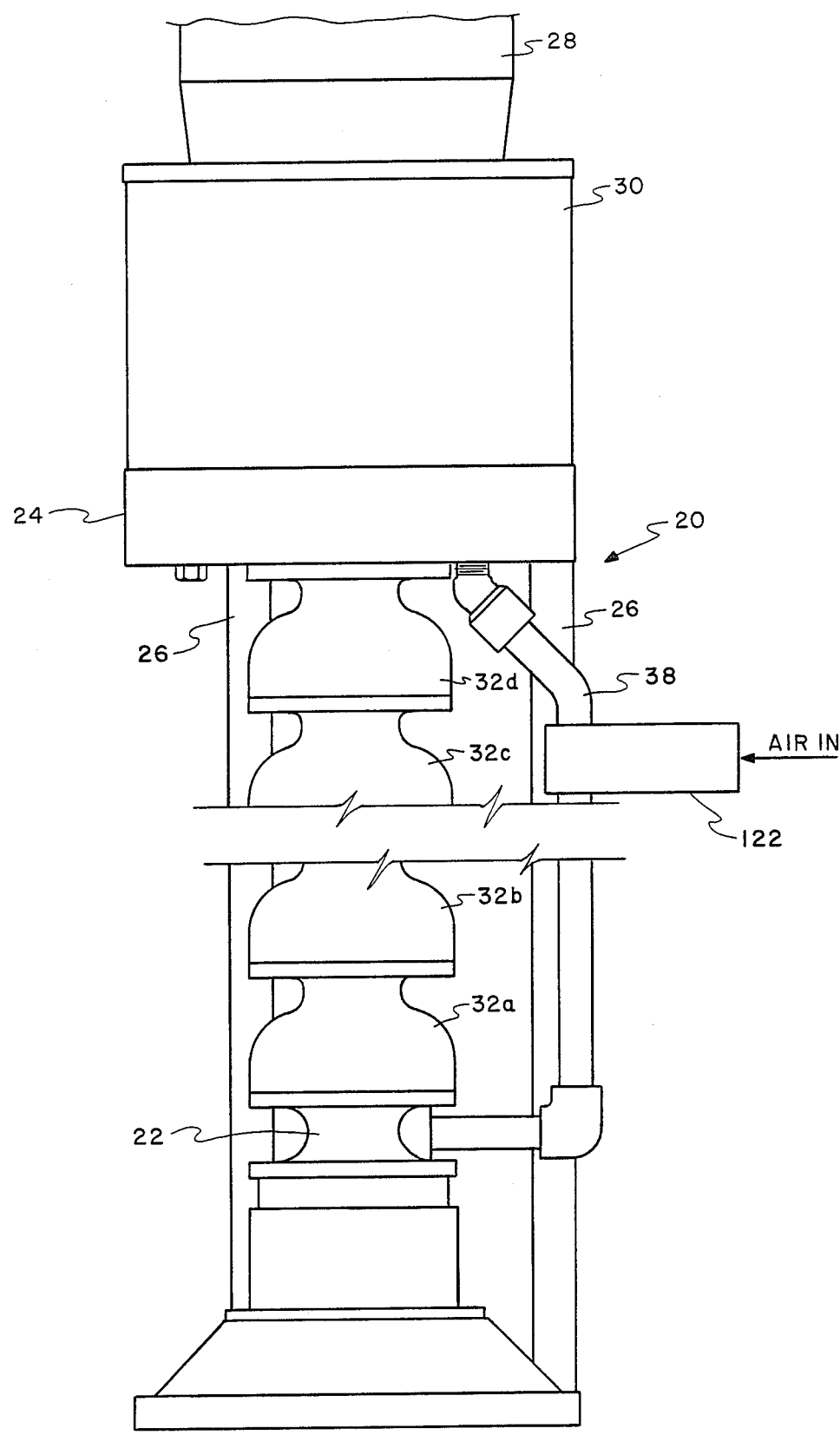
FIG. 1 is a side elevation view of an assembled multistage turbine pump, with which the invention may advantageously be used.

FIG. 1 illustrates a turbine pump, indicated generally at 20, with which the invention may advantageously be used. The pump includes a plurality of pumping stages connected in stacked, series relationship between an inlet housing 22 and an outlet housing 24. The housings and stages are fastened together by a plurality of tie rods 26, and an electric motor 28, carried on an enclosure 30, provides operating power for the pump. The pumping stages may include first, second, third and fourth stages 32a–32d, each of which has a liquid flow path between an inlet to and an outlet from the stage, although as many stages may be used as are required to develop a desired pressure of liquid. As interconnected, the flow paths are in series between a fluid inlet opening (not shown) to the housing 22 and a fluid outlet opening 34 (FIG. 2) from the housing 24, a pump impeller shaft 36 (FIG. 2) extends through and connects with an impeller within each stage, and a bypass line 38, between the outlet and inlet housings, provides a return path for some of the pumped liquid, as will be described. Each stage 32a–32d sequentially increases the pressure of liquid, so the fluid pressure at the outlet 34 equals the sum of the pressure increases developed by the individual stages.

Figure 2:
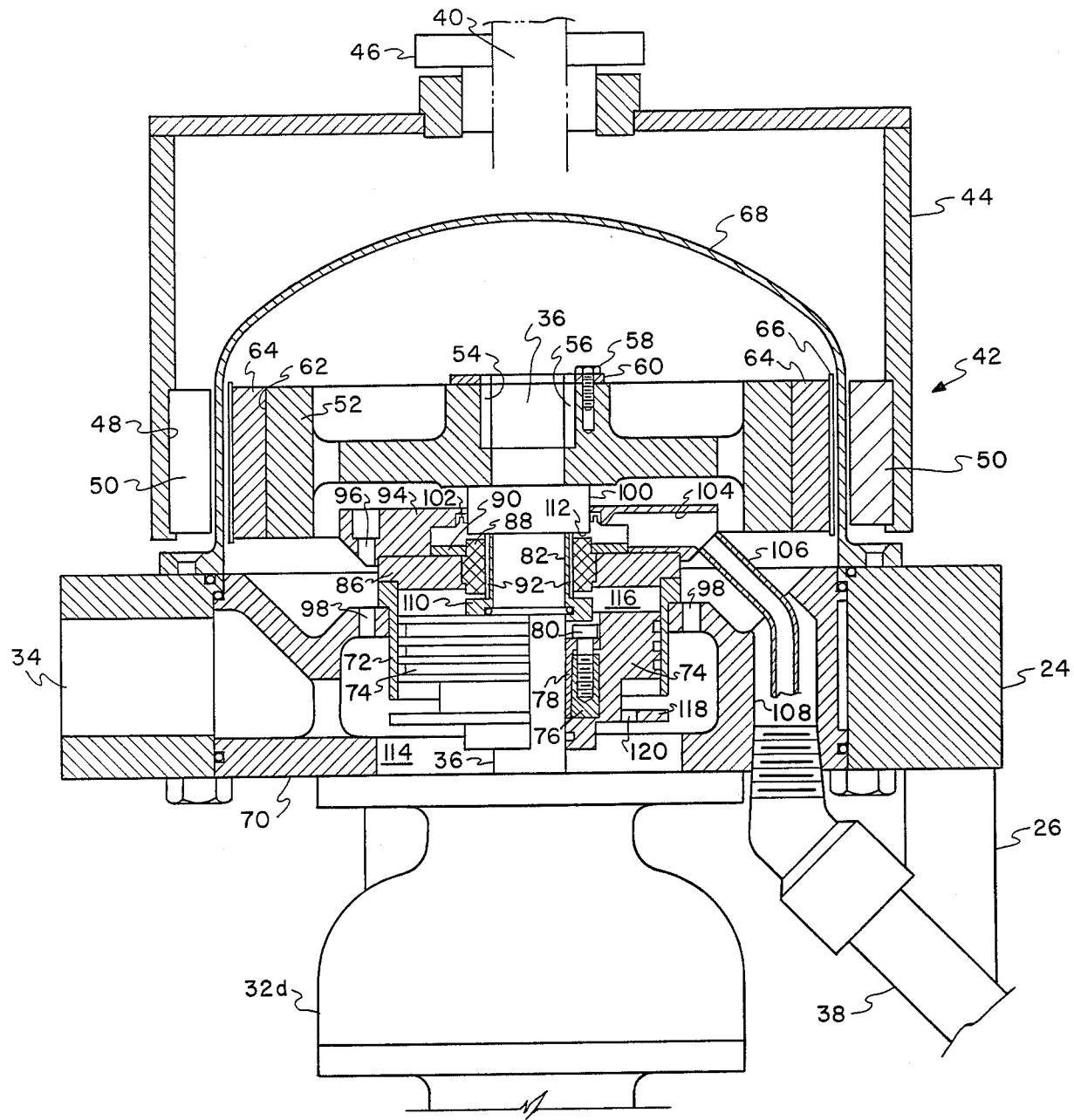
FIG. 2 is a cross sectional side elevation view of a magnetic clutch drive and impeller thrust force balancing mechanism of the pump, according to the teachings of the invention.

A magnetic clutch drive according to the invention, for coupling an output shaft 40 from the motor 28 to the pump impeller shaft 36, is shown in FIG. 2 and indicated generally at 42. The magnetic clutch drive includes an outer magnetic clutch member in the form of an inverted cup-shaped member 44 of magnetically permeable material, attached to the motor output shaft by a collet 46. An annular groove 48 is in and circumferentially around an inner surface of the member toward its lower end, and within the groove is an annular array of rectangular outer permanent magnets 50 separated by wedge-shaped aluminum spacers 51. The magnets and spacers are secured in the groove by any suitable means, such as by an epoxy adhesive, and the magnets are arranged so that their radially inner surfaces alternate in magnetic polarity around the array.

The magnetic clutch drive 42 also includes an inner magnetic clutch member in the form of a circular hub 52 of magnetically permeable material, having an axial passage for reception of an upper end of the pump impeller shaft 36. An upper end 54 of the passage has an enlarged, progressively increasing diameter to define a tapered annular space between the shaft and hub, and a tapered annular collet 56 extends and is forced downwardly into the space by bolts 58 that pass through an upper radial flange 60 of the collet to secure the hub to the impeller shaft. A plurality of spaced recesses 62 are in and circumferentially around an outer cylindrical surface of the hub, and within the recesses is an annular array of inner permanent magnets 64, equal in number to the magnets 50 and arranged so that their radially outer surfaces alternate in magnetic polarity around the array. To secure the magnets in the recesses, a nonmagnetic stainless steel band 66 is heated, placed around the circumference of the array and allowed to cool and shrink to hold the magnets in place and prevent them from being thrown off of the hub by centrifugal force during operation of the pump. An impermeable containment shell 68 of a nonmagnetic and electrically nonconductive material, such as of a glass reinforced plastic resin having a Teflon coating on its interior surface for solvent resistance, extends around the inner clutch member, between the arrays of outer and inner magnets 50 and 64, and is attached to and sealed with an upper surface of the outlet housing 24.

Figure 3:
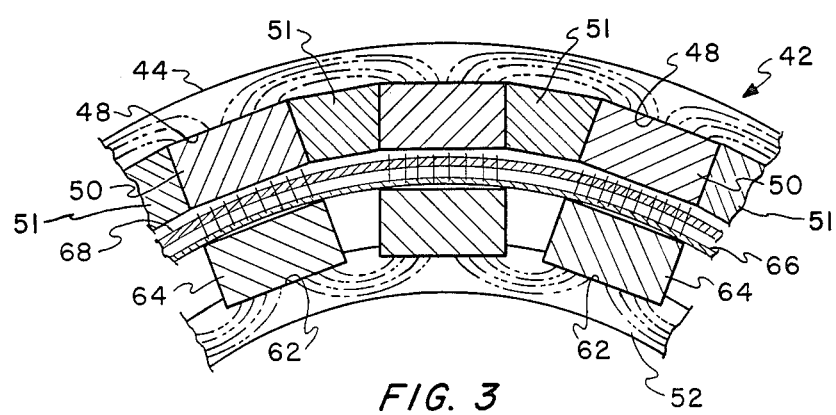
FIG. 3 is a cross sectional, fragmentary, top plan view of the magnetic clutch drive.

As mounted on the clutch members 44 and 52, facing surfaces of the outer and inner magnets 50 and 64 are about 0.240" apart. The steel band 66 and containment shell 68 are between the inner and outer arrays of magnets, but since each is of a nonmagnetically permeable material, each is transparent to magnetic lines of flux. Consequently, when north poles of the outer magnets 50 are aligned with south poles of the inner magnets 64, and vice versa, large numbers of magnetic circuits (FIG. 3) are established between the outer and inner magnets and through the member 44 and hub 52 to magnetically couple or lock the member and hub for conjoint rotation, despite the fact that there is no mechanical connection between the two. Thus, when the motor 28 is energized to rotate the outer clutch member 44 and its magnets 50, as the motor is brought up to speed, the outer and inner magnets couple the motor output shaft 40 to the pump impeller shaft 36 to drive the pump impellers at the same speed as the motor. In the event the pump becomes jammed as a consequence of induction of foreign matter, the magnetic forces coupling the shafts will be overcome to "disconnect" the shafts so that the pump can stop and the motor can continue to run without either of them becoming damaged. Advantageously, because of the magnetic clutch there is no requirement for the impeller shaft to extend through and to the exterior of the pump housing, which eliminates the need for a troublesome rotary seal between the shaft and housing, and accommodates the provision of a sealed housing for the pump. Also, because the containment shell 68 is electrically nonconductive, no eddy currents and associated eddy current losses are generated in the shell as the inner and outer magnets rotate around it.

During normal operation of the pump 20, there is thrust loading on the impellers in a direction opposite to that of liquid flow. The magnitude of thrust loading is generally directly proportional to pump output pressure and varies inversely with flow rate, so maximum thrust loading is experienced at pump start up and decreases with increasing flow rates. For paint circulating applications, the pump may operate in the range of 100–300 psi output pressure and 5–30 gpm flow rate, and depending upon the number and cross sectional areas of the impellers, downward thrust loading on the impeller shaft 36 may range from about 700–2200 pounds. For conventional turbine pumps where the shaft extends through the pump housing, thrust loading forces are supported by a thrust bearing outside the pump. However, since the pump 20 is driven by the motor 28 through the magnetic clutch 42, the impeller shaft is contained entirely within the pump housing, so thrust loading forces on the shaft cannot be supported by an external thrust bearing.

Accordingly, to counteract thrust forces on the impeller shaft 36, the invention also comtemplates a novel thrust force balancing mechanism that utilizes the pressure of pumped liquid to develop and exert on the shaft a force substantially equal in magnitude and opposite in direction to the thrust force. To that end, sealed with and carried within a center portion of the outlet housing 24 is a generally annular pump adapter 70 having a relatively large diameter axial passage in communication with and between the outlet from the last pumping stage 32d and the pump outlet 34. The upper surface of the adapter supports a radially extending shoulder of a thrust balance cylinder 72, a lower cylinder portion of which extends into the adapter passage. A thrust balance piston 74, having on its periphery a plurality of axially spaced circumferential-grooves defining sealing ribs therebetween, is slidable and rotatable within the thrust balance cylinder, and and rotatable within the thrust balance cylinder, and has a center passage through which the impeller shaft extends. A labyrinth seal is defined at the lower end of the piston passage, above the seal the passage has an enlarged diameter defining a space around the shaft, and in the space are respective outer and inner annular tapered collects 76 and 78 that are drawn together by bolts 80 to secure the piston to the shaft for conjoint axial and rotational movement with the shaft.

A generally cylindrical valve sleeve 82 is around and sealed with the impeller shaft 36 above the thrust balance piston 74 for axial and rotational movement with the shaft, and has a lower radial flange partially received within a central recess in an upper surface of the piston above the bolts 80. An annular cylinder cap 86 is supported around its lower periphery by the shoulder of the thrust balance cylinder 72, and carried within a center passage through the cylinder cap is an annular thrust bearing 88 in which the valve sleeve runs. An annular bearing retainer 90 holds the thrust bearing in the cylinder cap, and the valve sleeve has four axially extending flats on its outer surface above its flange, each about 90° apart and each extending through about 30° of arc, to define four passages 92 along and between the valve sleeve and thrust bearing.

A generally annular bypass deflector 94 is carried on the cylinder cap 86, and a plurality of bolts (not shown) extend through passages 96 in the bypass deflector into passages 98 in the pump adapter 70 to drawn the same together and capture therebetween the thrust balance cylinder 72 and cylinder cap. A thrust spacer 100, around and sealed with the impeller shaft 36 for axial and rotational movement with the shaft, is received within a center passage through the bypass deflector. An annular lip seal 102 is between the thrust spacer and bypass deflector, and the bypass deflector has a fluid outlet passage 104 that receives a tube 106 extending into an upper end of a pump adapter passage 108 connecting with the bypass line 38. When the inner clutch member 52 is mounted on the upper end of the impeller shaft, it is pressed down to tightly capture the thrust spacer 100 and valve sleeve 82 between it and the thrust balance piston 74.

The impeller shaft 36 is limited to axial movement between an upper position where an upper surface 110 of the annular radial flange of the valve sleeve 82 engages a lower surface of the thrust bearing 88, and a lower position where a lower surface 112 of the thrust spacer 100 engages an upper surface of the thrust bearing. The surface 112 therefore serves as an upper thrust face and the surface 110 as a lower thrust face. When the pump 20 is at rest and during start-up when maximum downward thrust loading is on the impellers and shaft, the upper thrust face 112 contacts the thrust bearing to support the shaft against thrust loading forces. However, as pump speed increases, the increasing pressure of liquid in a chamber 114 in the pump adapter 70, at the outlet from the last pumping stage 32d, acts on the bottom surface of the thrust balance piston 74 to urge the piston upwardly in the thrust balance cylinder 72 and counteract thrust loading forces on the impeller shaft. As pump speed continues to increase, the pressure of liquid in the chamber further increases and thrust loading forces on the shaft further decrease, until a point is reached where the pressure of liquid acting on the piston overcomes the thrust load, whereupon the piston moves upwardly in the thrust balance cylinder, lifting the impeller shaft and the upper thrust face 112 off of the thrust bearing. It is understood, of course, that the diameter of the piston, and therefore the area of its lower surface, is sufficient to provide lift for the shaft under all operating conditions of the pump.

The ribs on the periphery of the thrust balance piston 74 are of a diameter to accommodate limited leakage of liquid from the chamber 114, between the ribs and thrust balance cylinder 72, to a chamber 116 defined between the top of the piston, the surrounding wall of the thrust balance cylinder and the cylinder cap 86. Four radial grooves (not shown) at about 90° apart are in the upper surface of the thrust bearing 88, so liquid flows from the chamber 116 through a space between the lower thrust face 110 and thrust bearing, through the passages 92 between the thrust bearing and valve sleeve 82, and then through the grooves and any space between the upper thrust face 112 and thrust bearing into the outlet passage 104 in the bypass deflector 94. From the outlet passage, liquid flows through the tube 106 and pump adapter passage 108 for return to the pump inlet through the bypass line 38.

The pressure of liquid flowing into the chamber 116, as limited by the ribs on the periphery of the thrust balance piston 74 and escape of liquid from the chamber, acts on the upper surface of the piston and urges the piston downwardly. When the pump reaches the speed at which the pressure of liquid in the chamber 114 moves the piston upwardly to lift the upper thrust face 112 off of the thrust bearing 88, the lower thrust face 110 of the valve sleeve 82 moves toward the lower end of the thrust bearing. As pump speed continues to increase, the increasing pressure of liquid on the lower surface of the piston increasingly counteracts decreasing thrust loading forces, and continues to lift the piston and impeller shaft 36, causing the lower thrust face 110 to continue to approach the thrust bearing. When this occurs, the flow of liquid out of the chamber 116, through the space between the lower thrust face and thrust bearing, begins to be restricted and the pressure of liquid in the chamber and on the piston upper surface begins to increase. The increasing pressure of liquid above the piston, acting in the same direction as the thrust force, together with the downward thrust force, cause the piston to seek an equilibrium position with neither the upper nor lower thrust face in contact with the thrust bearing. The equilibrium position is reached when the downward force of the liquid in the chamber 116 on the upper surface of the piston, together with the downward thrust loading force, substantially equal the upward force of the liquid in the chamber 114 on the lower surface of the piston. Consequently, the thrust face 110 of the valve sleeve 82, in addition to serving as a contact surface for the thrust bearing, also serves, together with the thrust bearing, as a valve for controlling a flow of liquid out of the chamber 116, and therefore as a valve for controlling the pressure of liquid against the top surface of the piston.

Paint supplied to the coating stations is filtered downstream of the pump, so to prevent contaminants carried into the pump by the paint from entering and jamming or blocking the thrust force balancing mechanism, the thrust balance piston 74 has an enlarged diameter slinger disc 118 at its bottom. Contaminants carried by the paint toward the labyrinth seal between the piston and thrust balance cylinder 72 are flung away from the seal by the slinger disc as the piston rotates with the impeller shaft 36, and flow out of and are filtered from the paint downstream of the pump. When the disc approaches the bottom of the cylinder with upward movement of the piston, a plurality of passages 120 in the disc provide a positive flow path for paint to and through the labyrinth seal. The passages are sized to "filter out" large contaminants from the paint, while smaller contaminants are either flung outwardly by the disc or held by centrifugal force against the walls of the passages.

It is important that liquid not be allowed to accumulate within the containment shell 68, since that would create excessive drag between the shell and the inner clutch member 52 and its magnets 64, resulting in high amperage draw of the electric motor 28, heat build-up and material damage due to fluid shear. Although the containment shell is generally sealed off from the liquid at the pump outlet by the thrust force balancing mechanism, it nevertheless is exposed to liquid via a reverse flow through the bypass line 38, since liquid is normally supplied to the pump inlet under positive pressure. Therefore, the invention also contemplates that the containment shell be pressurized with air to trap an air bubble in the shell, and to that end an air control valve 122 is in series with the bypass line. Essentially, the air control valve is a float valve, and has an internal float (not shown) for sensing the level of liquid in the bypass line and an air inlet connected to a supply of air at a pressure greater than that of the liquid at the pump inlet. The float controls an internal air valve (not shown) for admitting air into the bypass line and therefore into the shell. When liquid in the bypass line is at or below a predetermined level the valve is closed, and when liquid in the line begins to rise above the predetermined level the value is opened. The air control valve therefore maintains a pressurized bubble of air in the shell and bypass line above the predetermined level, at about the same pressure as that of the liquid at the pump inlet, so that liquid always remains at or below the predetermined level in the bypass line, which advantageously prevents liquid from entering the shell and air from entering the pump inlet. Generally speaking, liquid flowing out of the tube 106 from the chamber 116 and into the bypass line simply displaces liquid already in the line, while the pressurized bubble of air maintains a "barrier" to prevent the liquid from rising above the predetermined level. However, the bubble of air is not static, since air becomes entrained in and is carried away by liquid flowing out of the tube, and the air bubble is therefore slowly diminished. When the air bubble is diminished to the point where liquid in the bypass line begins to rise above the predetermined level, the air valve is opened and the bubble is replenished to maintain the liquid level barrier at the predetermined level.

While embodiments of the invention have been described in detail, various modifications and other embodiments thereof may be devised by one skilled in the art without departing from the spirit and scope of the invention, as defined in the appended claims.

What is claimed is:

1. An improved rotary pump, comprising a pumping stage having an inlet and an outlet and an impeller shaft connected to an impeller in said stage; means for rotating said shaft and thereby said impeller to pump liquid from said inlet to said outlet, said shaft and impeller being axially movable and the liquid, upon rotation of said impeller, developing an axial thrust force on said impeller and therefore on said shaft; a thrust balance piston connected to said shaft for axial movement conjointly with said shaft; means for applying liquid at said pumping stage outlet to one end of said piston, so that the pressure of the liquid on said one end urges said piston and therefore said shaft in an axial direction against that of the thrust force; means for applying liquid from said pumping stage outlet to an opposite end of said piston to exert pressure thereon to urge said piston and shaft in an axial direction the same as that of the thrust force; and means for controlling the pressure of liquid on said piston opposite end in accordance with the axial position of said piston and shaft, such that the pressure of liquid on said piston opposite end increases with axial movement of said piston and shaft in the direction against that of the thrust force and decreases with axial movement of said piston and shaft in the opposite direction, whereby upon operation of said pump said piston and shaft move axially to an equilibrium position whereat the force of the liquid on said opposite end of said piston, together with the thrust force, substantially equal the force of the liquid on said one end of said piston, wherein said impeller shaft extends out of and to the exterior of said pumping stage and said means for rotating comprises a first magnetic clutch member connected to said shaft to the exterior of said stage for rotating said shaft; a second magnetic clutch member juxtaposed to but spaced from and magnetically coupled to said first magnetic clutch member; and means for rotating said second magnetic clutch member to conjointly rotate said first magnetic clutch member through the magnetic coupling to thereby rotate said shaft, and including a housing of nonmagnetic material extending between and separating said first and second magnetic clutch members and receiving said first magnetic clutch member within an interior thereof, and means for preventing liquid from entering said housing interior and contacting said first magnetic clutch member.

2. An improved rotary pump, comprising a pumping stage having an inlet and an outlet and an impeller shaft connected to an impeller in said stage; means for rotating said shaft and thereby said impeller to pump liquid from said inlet to said outlet, said shaft and impeller being axially movable and the liquid, upon rotation of said impeller, developing an axial thrust force on said impeller and therefore on said shaft; a thrust balance piston connected to said shaft for axial movement conjointly with said shaft; means for coupling liquid at said pumping stage outlet with one end of said piston, such that the pressure of liquid on said one end urges said piston and therefore said shaft in an axial direction against that of the thrust force; means for coupling liquid at said pumping stage outlet with an opposite end of said piston to exert pressure thereon to urge said piston and shaft in an axial direction the same as that of the thrust force; and means for controlling the pressure of liquid on said piston opposite end in accordance with the axial position of said piston and shaft, such that the pressure of liquid on said piston opposite end increases with axial movement of said piston and shaft in the direction against that of the thrust force and decreases with axial movement of said piston and shaft in the opposite direction, whereby upon operation of said pump said piston and shaft move axially to an equilibrium position whereat the force of the liquid on said opposite end of said piston, together with the thrust force, substantially equal the force of the liquid on said one end of said piston, wherein said impeller shaft extends to the exterior of said pumping stage and said means for rotating comprises a first magnetic clutch member connected to said shaft to the exterior of said stage for rotating said shaft; a second magnetic clutch member juxtaposed to but spaced from and magnetically coupled to said first magnetic clutch member; and means for rotating said second magnetic clutch member to conjointly rotate said first magnetic clutch member through the magnetic coupling to thereby rotate said shaft, and including an impermeable shell of nonmagnetic and electrically nonconductive material extending around said first magnetic clutch member, between and out of contact with said first and second magnetic clutch members, and fastened to and sealed with said pumping stage to enclose said first magnetic clutch member; seal means for inhibiting passage of liquid from said pumping stage to said shell interior; means for generating a positive pressure of gas in said shell interior and drain means connecting the interior of said shell with said pumping stage inlet for return to said inlet of any liquid leaking past said seal means and that would otherwise enter said shell, said generating means maintaining the gas in said shell at a pressure at least equal to the pressure of liquid at said inlet to prevent a flow of liquid from said inlet into said shell.

3. An improved rotary pump, comprising a pumping stage having an inlet and an outlet and an impeller shaft connected to an impeller in said stage, a portion of said shaft extending out of and to the exterior of said stage; a first magnetic clutch member connected to said shaft to the exterior of said stage for rotating said shaft; a second magnetic clutch member juxtaposed to but spaced from and magnetically coupled to said first magnetic clutch member for conjoint rotation of said first and second magnetic clutch members; and means for rotating said second magnetic clutch member to rotate said first magnetic clutch member through the magnetic coupling to thereby rotate said shaft and impeller to pump liquid from said inlet to said outlet of said stage, said shaft and impeller being axially movable and the liquid, upon rotation of said impeller developing an axial thrust force on said impeller and shaft in a direction urging said portion of said shaft to the exterior of said stage toward the interior of said stage, and further including a thrust balance cylinder around said portion of said shaft to the exterior of said stage; a thrust balance piston connected to said shaft and received within said cylinder for axial and rotational movement in said cylinder conjointly with said shaft; and means for applying liquid at said pumping stage outlet to one end of said pistion toward said stage, so that the pressure of the liquid against said one end urges said piston and thereby said shaft in a direction away from said stage to counteract the thrust force on said impeller and shaft, wherein said thrust balance cylinder and thrust balance piston are intermediate said first magnetic clutch member and pumping stage, and said means for coupling includes a pump adapter housing on said pumping stage intermediate said first magnetic clutch member and said stage with said stage outlet in communication with one end of an axial passage through said adapter housing and said impeller shaft extending through said passage, said thrust balance cylinder extending at one end at least partially into an opposite end of said adapter passage in generally sealed relationship with said passage, so that said one end of said thrust balance piston toward said pumping stage outlet is acted upon by the pressure of liquid at said outlet.

4. An improved rotary pump as in claim 3, wherein said thrust balance piston and thrust balance cylinder form a limited seal therebetween so that a limited amount of liquid from said pumping stage outlet flows between said piston and cylinder to an opposite end of said piston, and including a cylinder cap carried on an opposite end of said thrust balance cylinder to define a chamber between said cylinder cap, said opposite end of said piston and the surrounding portion of said thrust balance cylinder; and valve means coupled with said piston and impeller shaft for opening an outlet from said chamber upon axial movement of said piston and shaft toward said pumping stage and for closing said chamber outlet upon axial movement of said piston and shaft away from said stage, so that during operation of said pump the limited flow of liquid enters said chamber and the pressure of the liquid in said chamber acts on said opposite end of said piston to urge said piston and shaft toward said pumping stage, and said valve means controls the flow path of liquid through said chamber outlet to control the pressure of liquid in said chamber, whereby said piston and shaft move axially to an equilibrium position whereat the force exerted on said opposite end of said piston by the pressure of liquid in said chamber, together with the thrust force, substantially equal the force exerted on said one end of said piston by the pressure of liquid at said pumping stage outlet.

5. An improved rotary pump as in claim 4, wherein said valve means includes a valve sleeve around said impeller shaft intermediate said thrust balance piston and said first magnetic clutch member and having an annular radial flange at one end thereof adjacent said piston opposite end, a thrust spacer around said shaft intermediate said first magnetic clutch member and valve sleeve and adjacent to an opposite end of said valve sleeve, and a thrust bearing carried in an axial passage through said cylinder cap and around and in running contact with said valve sleeve above said radial flange, said thrust bearing having an axial length less than the axial length of said valve sleeve above said radial flange so that said piston and shaft are limited to axial movement between a position away from said pumping stage whereat said valve sleeve flange engages one end of said thrust bearing and a position toward said stage whereat said thrust spacer engages an opposite end of said thrust bearing, said valve sleeve having at least one flat of limited arcuate extent extending axially along its surface between said flange and said opposite end thereof to define at least one passage between and axially along said valve sleeve and thrust bearing, said valve sleeve flange and said one end of said thrust bearing defining therebetween said outlet from said chamber, so that liquid in said chamber flows between said flange and said one end of said thrust bearing, through said at least one passage and to and through a space between said thrust spacer and said opposite end of said thrust bearing, whereby upon axial movement of said piston and shaft away from said pumping stage said valve sleeve flange moves toward said one end of said thrust bearing to restrict said outlet from said chamber and increase the pressure of liquid in said chamber, and upon axial movement of said piston and shaft toward said pumping stage said valve sleeve flange moves away from said one end of said thrust bearing to enlarge said outlet from said chamber and decrease the pressure of liquid in said chamber.

6. An improved rotary pump as in claim 5, including a bypass deflector around said thrust spacer and having a passage therein in communication with said space between said thrust spacer and said opposite end of said thrust bearing for receiving liquid flowing through said space from said chamber.

7. An improved rotary pump as in claim 6, including means providing a flow path for liquid in said bypass deflector passage to said pumping stage inlet.

8. An improved rotary pump as in claim 6, including a housing of nonmagnetic material extending between and separating said first and second magnetic clutch members and receiving said first magnetic clutch member within an interior thereof, and means for preventing liquid from entering said housing interior and contacting said first magnetic clutch member.

9. An improved rotary pump as in claim 7, including an impermeable shell of nonparamagnetic and electrically nonconductive material extending around said first magnetic clutch member and between and out of contact with said first and second magnetic clutch members with an interior of said shell in communication with said means for providing a flow path to said pumping stage inlet, and means for establishing a positive pressure of gas within said shell interior to move liquid in said bypass deflector passage through said means for providing a flow path to said pumping stage inlet to prevent entry of liquid into said shell interior and contact of liquid with said first magnetic clutch member.

10. An improved rotary pump, comprising a pumping stage having an inlet and an outlet and an impeller shaft connected to an impeller in said stage and extending through said outlet to the exterior of said stage; a first magnetic clutch member connected to said impeller shaft to the exterior of said stage for rotating said shaft; a second magnetic clutch member juxtaposed to but spaced from and magnetically coupled to said first magnetic clutch member for conjoint rotation of said first and second magnetic clutch members; means for rotating said second magnetic clutch member to rotate said first magnetic clutch member through the magnetic coupling to thereby rotate said shaft and impeller to pump liquid from said inlet to said outlet of said stage; an impermeable shell of nonparamagnetic material extending around and enclosing said shaft and first magnetic clutch member exteriorly of said stage and extending between and out of contact with said first and second magnetic clutch members; and means for preventing liquid from entering the interior of said shell and contacting said first magnetic clutch member.

11. An improved rotary pump as in claim 10, wherein said means for preventing includes means for establishing a positive pressure of gas in said shell interior to prevent a flow of liquid into said shell and into contact with said first magnetic clutch member.

12. An improved rotary pump as in claim 11, wherein said shell is of a material that is also electrically nonconductive, so that eddy currents are not generated in said shell by said first and second magnetic clutch members.

13. An improved rotary pump as in claim 11, wherein said means for preventing further includes means for providing a flow path between said shell interior and said pumping stage inlet for return to said inlet of any liquid that would otherwise enter said shell interior.

14. An improved rotary pump as in claim 13, wherein said establishing means maintains gas in said shell interior at a pressure substantially equal to the pressure of liquid at said pumping stage inlet to prevent a flow of liquid from said pumping stage inlet through said means for providing a flow path to said shell interior.

* * * * *